J. C. THAYER.
Milk Cooler.
No. 79,613.
Patented July 7, 1868.
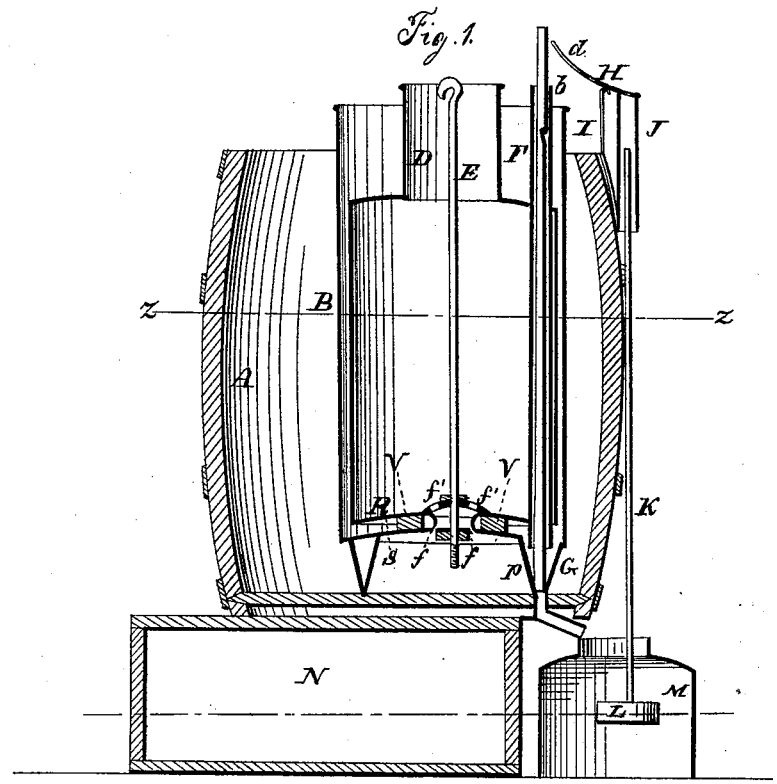
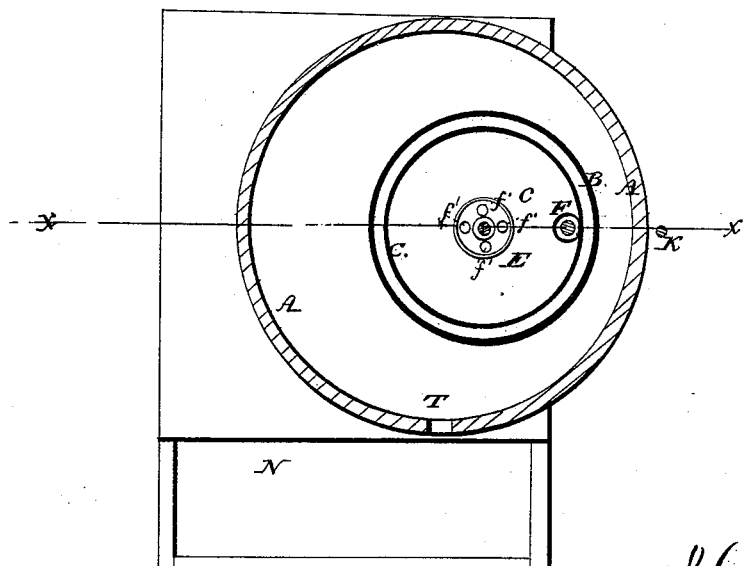
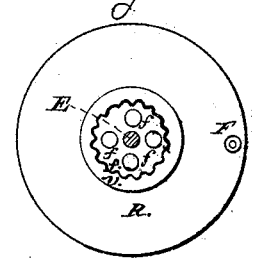
Witnesses
INVENTOR:
J. C. Thayer

United States Patent Office.

J. C. THAYER, OF DUNTON, ILLINOIS.

*Letters Patent No. 79,613, dated July 7, 1868.*

IMPROVEMENT IN MILK-COOLER.

*The Schedule referred to in these Letters Patent and making part of the same.*

TO ALL WHOM IT MAY CONCERN:

Be it known that I, J. C. THAYER, of Dunton, in the county of Cook, in the State of Illinois, have invented an Improved Milk-Cooler; and I do hereby declare that the following is a full and exact description thereof, reference being had to the accompanying drawings, and to the letters of reference marked thereon, making a part of this specification, in which—

Figure 1 is a central sectional elevation of my invention, taken through the line X X, fig. 2.

Figure 2, a horizontal section of the same, taken through fig. 1 on the line Z Z.

Figure 3, a view of the bottom of the inner tank.

This invention relates to a novel device for cooling large quantities of milk in a short space of time, preparatory to its being set for the cream to rise, or the making of cheese; and its nature consists in the use of a series of tanks, the smaller ones being arranged inside of those which are larger, and having openings communicating with the outer and inner tanks, by means of which the milk in the second tank is surrounded by water on every part except the top, which is left open for the animal heat in the milk to escape; and further, in making the inner tank removable, for the purpose of cleaning the milk-tank, and in the use of a float, arranged to operate in the can to be filled, and shut a drop-valve which closes the discharge-pipe of the milk-tank.

To enable others to make and use my invention, I have marked corresponding parts with similar letters, and will now give a detailed description.

A represents a common wooden tank, arranged to set over a trough, N, or other suitable receptacle for saving waste water, and with an opening, T, for drawing off warm water from the top of the tank, said opening being closed by a cock or otherwise, as most convenient. Other openings may be made in the tank lower down, and thus provide means for drawing off all of the water in a short space of time. B represents what I term the second tank, and is used to hold the milk to be cooled, and it should be made of some kind of metal which will not readily corrode, and with openings, $f$, through its bottom, communicating with the tank A, and a third tank, C, in order that the latter may fill with water. The bottom of the tank C is set such a distance from the bottom of tanks B, as will correspond with the space between the peripheries of the said tanks, and the communication, by means of holes $f f'$, is made perfect by the use of an annular packing, V, rigidly attached to the bottom of tank C, and held in place against the bottom of tank B by a rod, E, having a screw-thread on its lower end, and a nut at the under side of said tank B, the rod E being long enough to be operated from the outside of the cooler, as seen at fig. 1. The bottom of tank B has a pipe, P, for conveying milk when cooled into a can shown at M. The device for closing the pipe P when the can is full, is as follows: A drop-valve, G, is made to operate in a tube, F, and close the funnel-shaped pipe P, when a catch, $a$, made on the valve, is loosened from a nib, $b$, at the top of said pipe. A guide, J, is rigidly attached to the outside of standard I, and is made to support the upper end of the float-stem K, which operates a lever, H, and causes the drop-valve G to fall. This lever is pivoted to the standard I which is attached to the tank A, and its outer end is made by its own weight to rest on the guide J, so as not to disturb the valve G until the milk in the can M has raised the float L to the top.

*Operation.*

The tanks A C should be filled with cold water, or water and ice, as the case may require, after which the milk can be put in the tank B, and as fast as cooled it will be discharged, by means of the pipe P, into the can M. After the cooling process is over, the rod E can be turned out of the nut at the bottom, which will permit the tank C to be removed for cleaning the tank B, or, if desirable, the rod E can be turned once or twice around, which will permit water enough to enter the tank B to thoroughly rinse it out.

Having thus fully described my invention, what I claim, and desire to secure by Letters Patent of the United States, is—

1. The combination of the tanks A B C, the latter tank being removable, and having a pipe, F, for the stem of the valve G to operate in, substantially as and for the purpose set forth.

2. The combination of the valve G, pipes F and P, lever H, and float K L, substantially as herein set forth and shown.

3. The combination of the tanks A B C, pipes F P, valves G, lever H, and float K L, constructed and arranged to operate as and for the purpose set forth.

J. C. THAYER.

Witnesses:
 GEO. L. CHAPIN,
 A. HAYWARD.